United States Patent
Liang et al.

(10) Patent No.: US 8,259,846 B2
(45) Date of Patent: Sep. 4, 2012

(54) APPARATUS AND METHOD FOR GENERATING A MULTICARRIER COMMUNICATION SIGNAL HAVING A REDUCED CREST FACTOR

(75) Inventors: Xin Liang, Beijing (CN); Xin-Xing Yang, Beijing (CN)

(73) Assignee: Motorola Mobility LLC, Libertyville, IL (US)

( * ) Notice: Subject to any disclaimer, the term of this patent is extended or adjusted under 35 U.S.C. 154(b) by 864 days.

(21) Appl. No.: 12/182,355

(22) Filed: Jul. 30, 2008

(65) Prior Publication Data

US 2010/0027690 A1  Feb. 4, 2010

(51) Int. Cl.
*H04K 1/02* (2006.01)
(52) U.S. Cl. ....... 375/296; 375/285; 375/297; 455/63.1; 455/67.11; 455/114.2; 455/115.1; 455/501
(58) Field of Classification Search .................. 375/260, 375/296–297, 295; 370/206, 209–210; 455/63.1, 455/67.11, 114.2, 115.1, 501
See application file for complete search history.

(56) References Cited

U.S. PATENT DOCUMENTS

| | | | |
|---|---|---|---|
| 6,522,869 B1 * | 2/2003 | Hiramatsu et al. | 455/127.2 |
| 6,687,511 B2 * | 2/2004 | McGowan et al. | 455/522 |
| 6,999,733 B2 | 2/2006 | Hori et al. | |
| 7,013,161 B2 * | 3/2006 | Morris | 455/522 |
| 7,020,215 B2 * | 3/2006 | Porco et al. | 375/297 |
| 7,061,990 B2 * | 6/2006 | Wright et al. | 375/296 |
| 7,103,029 B1 * | 9/2006 | Minowa | 370/342 |
| 7,340,004 B2 * | 3/2008 | Vuopala et al. | 375/295 |
| 7,349,817 B2 * | 3/2008 | Cha | 702/66 |
| 7,486,738 B2 * | 2/2009 | Trivedi | 375/260 |
| 7,817,746 B2 * | 10/2010 | Hori et al. | 375/296 |
| 7,873,116 B2 * | 1/2011 | Okada et al. | 375/295 |
| 2003/0086501 A1 * | 5/2003 | Dreps et al. | 375/257 |
| 2003/0086507 A1 * | 5/2003 | Kim et al. | 375/297 |
| 2006/0029158 A1 * | 2/2006 | Lipka et al. | 375/300 |
| 2007/0076588 A1 | 4/2007 | Alapuranen | |
| 2007/0129026 A1 * | 6/2007 | Marsili | 455/114.2 |
| 2007/0140367 A1 | 6/2007 | Braithwaite | |
| 2008/0019453 A1 | 1/2008 | Zhao et al. | |
| 2009/0029664 A1 * | 1/2009 | Batruni | 455/212 |

OTHER PUBLICATIONS

Hemphill, Ed et al.: "Peak Cancellation Crest Factor Reduction Reference Design", Application Note: Virtex-5 and Virtex-4 Family, Xilinx, XAPP1033 (v1.0), Dec. 5, 2007, www.xilinx.com, pp. 1-32.

* cited by examiner

*Primary Examiner* — Sam K Ahn
*Assistant Examiner* — Sophia Vlahos (57) ABSTRACT

An apparatus for generating a multicarrier communication signal having a reduced crest factor enables efficient power amplifier operation. The apparatus includes a plurality of shaping filters (205-*n*) for outputting a plurality of shaped baseband transmission signals. A plurality of mixers (210-*n*) then multiplies each signal by one of a plurality of complex carrier signals. A window function generator (235) generates a clipping window signal based on power levels of the unshaped baseband transmission signals. A plurality of window output units (245-*n*) outputs a plurality of subtraction-based clipping window signals. At least one summing unit (260) then generates the multicarrier communication signal having the reduced crest factor from the plurality of subtraction-based clipping window signals and the plurality of shaped baseband transmission signals.

13 Claims, 7 Drawing Sheets

APPARATUS AND METHOD FOR GENERATING A MULTICARRIER COMMUNICATION SIGNAL HAVING A REDUCED CREST FACTOR

FIELD OF THE INVENTION

The present invention relates generally to mobile communication devices, and in particular, but not exclusively, to enabling efficient operation of power amplifiers by reducing peak to average amplitude ratios of communication signals.

BACKGROUND

Radio frequency (RF) power amplifiers are used in wireless communication networks for the transmission of signals. Solid state RF power amplifiers can be modeled by amplitude-modulation/amplitude-modulation (AM/AM) characteristics, because amplitude-modulation/phase-modulation (AM/PM) characteristics are generally negligible. As the amplitude of an input signal of an amplifier is increased, the output signal will begin to saturate at some level in the RF amplifier. The amplitude where the output signal moves from a linear region to a saturation region is often referred to as the one decibel (1 dB) compression point of the amplifier.

Different models for RF power amplifiers have been developed, and an important feature of these models is the manner in which the output signal moves from the linear region to the saturation region. To maintain linear operation, power amplifiers are usually backed off by some number of dBs from the one decibel (1 dB) compression point. The required back-off depends on the crest factor (CF) of the input signal. For orthogonal frequency division multiplexing (OFDM) modulation, back-offs higher than 5 dB are generally used. Typical back-off numbers are in the region of 9-12 dB for 64 carrier OFDM (64 OFDM) signals.

As known by those having ordinary skill in the art, the crest factor (CF) of a signal can be defined as the peak to average amplitude ratio. A peak to average power ratio (PAPR) can be computed from the CF. High CF multi-carrier modulation, such as OFDM, can pose problems for RF power amplifiers because the amplifiers require high linearity to reproduce the high peak powers of a signal without distortion.

The high CF of OFDM results from individual carrier components being added together at different phases in an Inverse Fast Fourier Transform (IFFT). The CF is relatively independent of the modulation method of the individual carriers when there are many sub carriers. The CF is also relatively independent of the number of sub carriers for practical 32-256 sub carrier OFDM modulations.

If the CF of a signal can be reduced prior to inputting the signal to an RF power amplifier, the back-off can be reduced and mean output power can be increased. Numerous CF reduction methods have thus been developed. Generally, these include selective mapping, where multiple information equivalent signals are created and the signal with the lowest CF is selected for transmission. Partial transmit signal techniques use a similar approach, where multiple partial signals are generated and the most beneficial linear combination is transmitted. In addition, hard and soft clipping methods are used to limit CF by removing or reducing peaks.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to generating a multicarrier communication signal having a reduced crest factor. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

According to one aspect, the present invention is an apparatus for generating a multicarrier communication signal having a reduced crest factor. The apparatus includes a plurality of shaping filters for receiving a plurality of unshaped baseband transmission signals and outputting a corresponding plurality of shaped baseband transmission signals. A plurality of mixers, each operatively connected to one of the plurality of shaping filters, then multiplies each signal of the plurality of shaped baseband transmission signals by one of a plurality of complex carrier signals. A window function generator generates a clipping window signal based on power levels of the plurality of unshaped baseband transmission signals. A plurality of window output units, each operatively connected to both the window function generator and to a peak detector, outputs a plurality of subtraction-based clipping window signals. At least one summing unit, operatively connected to the plurality of window output units and to the plurality of mixers, generates the multicarrier communication signal having the reduced crest factor from the plurality of subtraction-based clipping window signals and the plurality of shaped baseband transmission signals.

Some embodiments of the present invention therefore enable a reduction in the crest factor (CF) of signals transmitted from high power amplifiers, which in turn enables more efficient amplifier design and operation. Instead of deploying multiplication windows, embodiments of the present invention deploy a subtraction window that does not affect the frequency spectrum envelop. Because a power level of each carrier is considered, interference caused by clipping can be appropriately distributed to all carriers. Further, because the subtraction window has a sharp peak in the time domain, undesirable clipping of neighboring peaks is avoided.

Figure 1:
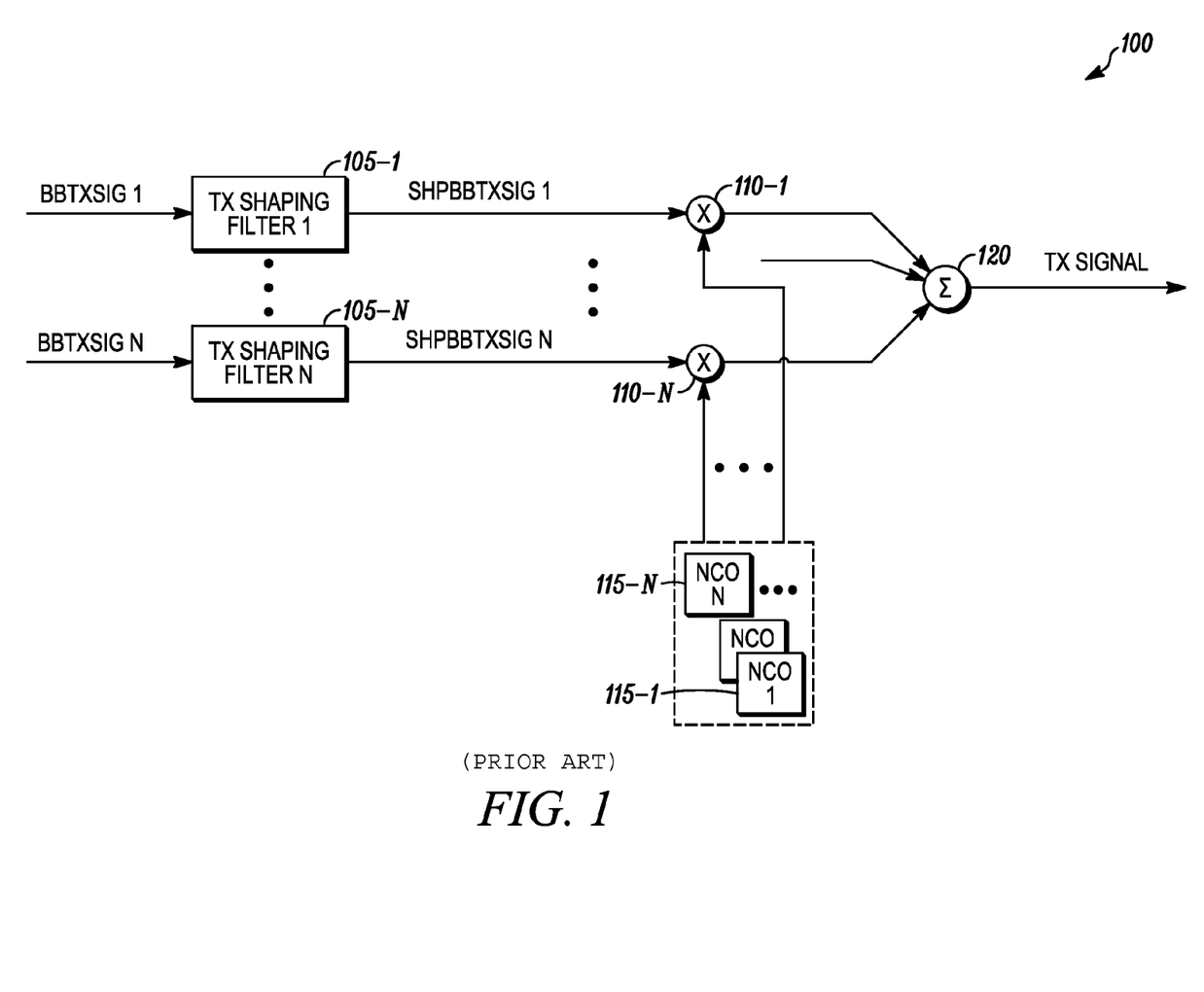
FIG. 1 is a block diagram illustrating components of a multi-carrier transmitter that does not employ crest factor reduction techniques, according to the prior art.

Referring to FIG. 1, a block diagram illustrates components of a multi-carrier transmitter 100 that does not employ crest factor reduction techniques, according to the prior art. Transmission shaping filters 105-1 to 105-N receive a plurality of unshaped baseband transmission signals (BBTxSig1 to BBTxSigN) and output a corresponding plurality of shaped baseband transmission signals (ShpBBTxSig1 to ShpBBTxSigN), where N corresponds to the number of unshaped baseband transmission signals. Each of the shaped baseband transmission signals is then multiplied by a corresponding complex carrier signal in one of a plurality of mixers 110-1 to 110-N. The complex carrier signals are generated in numeric control oscillators (NCOs) 115-1 to 115-n. The product signals are then summed in a summing unit 120 to form a final transmission signal.

Figure 2:
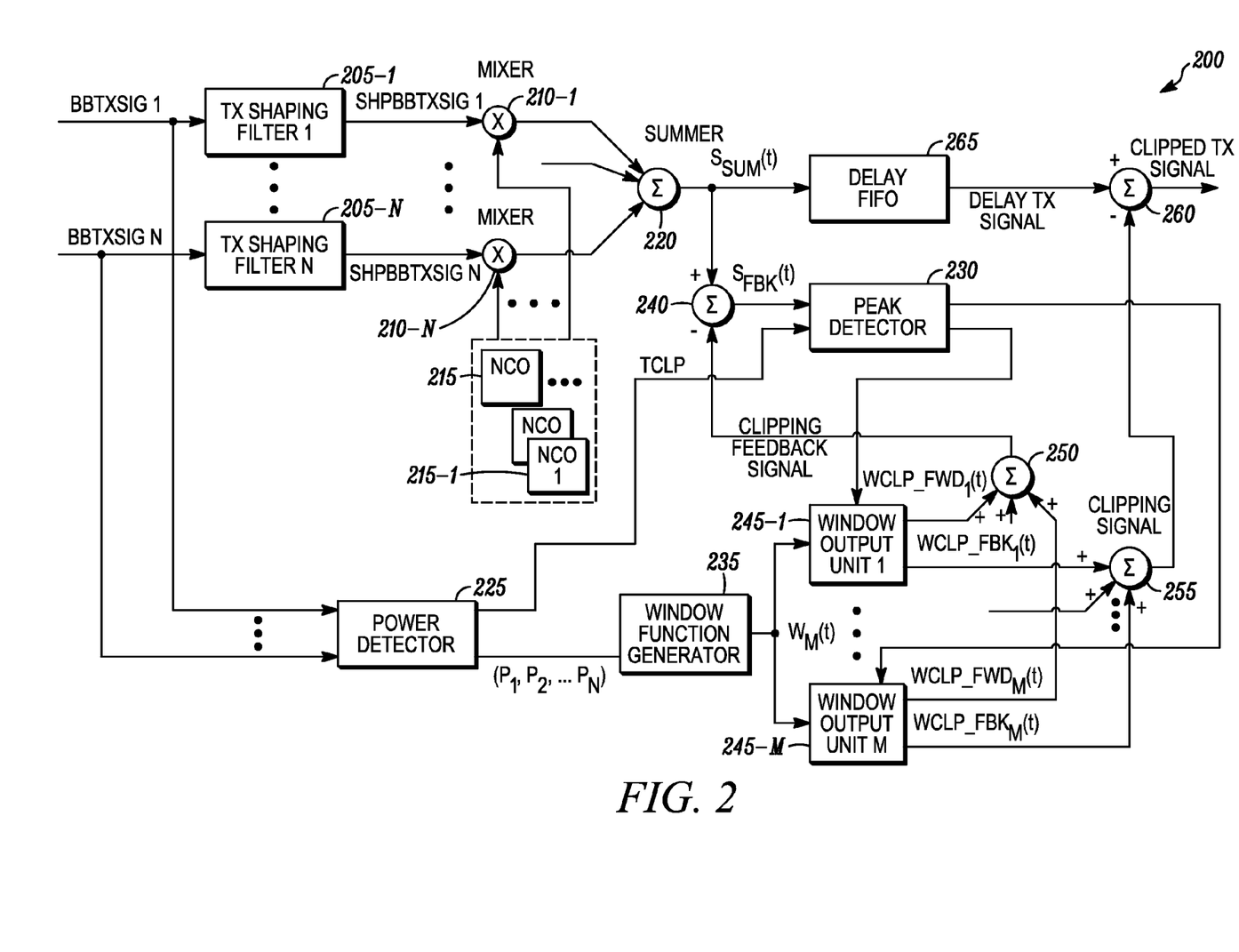
FIG. 2 is a block diagram illustrating components of a multi-carrier transmitter that employs crest factor reduction techniques, according to some embodiments of the present invention.

Referring to FIG. 2, a block diagram illustrates components of a multi-carrier transmitter 200 that employs crest factor reduction techniques, according to some embodiments of the present invention. Transmission shaping filters 205-1 to 205-N receive unshaped baseband transmission signals and output shaped baseband transmission signals, where N corresponds to the number of unshaped baseband transmission signals. Each of the shaped baseband transmission signals is then multiplied by a corresponding complex carrier signal in one of a plurality of mixers 210-1 to 210-N. The complex carrier signals are generated in numeric control oscillators (NCOs) 215-1 to 215-N. The product signals are then summed in a summing unit 220 to form a summed transmission signal.

A power detector 225 detects power levels of the unshaped baseband transmission signals and outputs power level signals to a peak detector 230 and to a window function generator 235. The window function generator 235 generates a clipping window signal based on power levels of the plurality of unshaped baseband transmission signals. The peak detector 230 is also operatively connected to the plurality of mixers 210-1 to 210-N through the summing unit 220 and a summing unit 240.

A plurality of window output units (WOUs) 245-1 to 245-M receive the clipping window signal from the window function generator 235, and also receive a peak signal from the peak detector 230. As described in detail below, "M" represents a required number of WOUs. The window output units 245-1 to 245-M then output a plurality of subtraction-based clipping window signals to a summing unit 250 and to a summing unit 255. The summing unit 250 is operatively connected to the summing unit 240, and the summing unit 255 is operatively connected to a summing unit 260. The summing unit 260 is also operatively connected to a first in first out (FIFO) delay module 265.

Further details concerning the above described elements of the multi-carrier transmitter 200 are provided below.

Concerning the transmission shaping filters 205-1 to 205-N, the BBTxSig1 to BBTxSigN denote prior-to-shaping baseband signals on different carriers. Such signals generally have high out-of-band emission. Thus, to improve bandwidth efficiency and meet spectrum specifications, shaping is needed prior to transmission.

The signals input to the shaping filters 105-1 to 105-N can be denoted as:

$$s_i(t), (i=1,2,\ldots N)$$

where i is an index of carriers, t is time, and N is the total number of signals.

Coefficients of the shaping filters 105-1 to 105-N are determined in a digital up-converter (DUC) process, and determined based on system criteria, as is known by those having ordinary skill in the art. For example, consider that $h_i(t)$ $(-T_i^{Shp} \leq t \leq T_i^{Shp})$ denotes a unitary impulse response of the shaping filters 105-1 to 105-N. $[-T_i^{Shp}, T_i^{Shp}]$ is the time span of $h_i(t)$, where $h_i(t)$ reaches a peak value at t=0. That in turn means:

$$h_i(0) = \max_{-T_i^{Shp} \leq t \leq T_i^{Shp}} \{h_i(t)\} = 1 \qquad \text{Eq. 1}$$

If all baseband transmission signals have the same modulation scheme and bandwidth, then $h_i(t)$ $(-T_i^{Shp} \leq t \leq T_i^{Shp})$ can be identical for all index i. However, it does not preclude $h_i(t)$ from changing with the index i (e.g., $h_i(t) \neq h_j(t)$ when $i \neq j$). The outputs of the shaping filters 105-1 to 105-N are thus determined by the following equation:

$$s_{SPi}(t) = s_i(t) * h_i(t) = \int_{-T_{SLi}}^{T_{SRi}} s_i(t-\tau)h_i(\tau + T_{SRi})d\tau \qquad \text{Eq. 2}$$

where i=1 to N, and $\tau$ is a time variable used in integration.

The numeric control oscillators (NCOs) 215-1 to 215-N are part of a digital up-converter (DUC) process. Each NCO 215-1 to 215-N generates a low spur complex carrier to modulate each baseband signal to a different baseband frequency offset. The resulting signal having a different frequency offset can be summed, and then up-converted to a radio frequency with a single RF synthesizer.

An output of the NCOs 215-1 to 215-N can be interpreted as follows:

$$NCO_o = e^{j2\pi f_i t} e^{j\phi_i} \qquad \text{Eq. 3}$$

where i is the index of a carrier, $f_i(i=1,2,\ldots N)$ denotes a radix frequency, and $e^{j\phi_i}$ is an initial phase offset of the i th NCO.

The mixers 210-1 to 210-N are used to multiply the i th shaped baseband transmission signal (ShpBBTxSig1 to ShpBBTxSigN) by the i th complex carrier signal, as shown by the following equation:

$$\text{MixerOutput}_i = s_{SPi}(t) e^{j2\pi f_i t} e^{j\phi_i t} \quad \text{Eq. 4}$$

The summing unit 220 simply sums all output signals from the mixers 210-1 to 210-N. The output of the summing unit 220 is thus defined by the following equation:

$$s_{sum}(t) = \sum_{i=1}^{N} s_{SPi}(t) e^{j2\pi f_i t} e^{j\phi_i} \quad \text{Eq. 5}$$

The power detector 225 is deployed to measure the long-term average power of each carrier in the form of the unshaped baseband transmission signals (BBTxSig1 to BBTxSigN). Those having ordinary skill in the art will appreciate that the power detector 225 can be omitted if the power of each carrier is pre-determined. If the average power of each carrier is $P_i$ (i=1,2, ..., n), then:

$$P_i = E\{|s_i(t)|^2\} \quad \text{Eq. 6}$$

For example, if the power of each carrier can be obtained from code division multiple access (CDMA) signal generation modules (not shown) of the multi-carrier transmitter 200, then the power detector 225 could be omitted from the multi-carrier transmitter 200.

The window function generator 235 is used to generate a clipping (i.e., cancellation) window signal for reduction of a crest factor. The window function generator 235 generates a clipping window signal based on a unitary clipping window function that conforms to the following equation:

$$w(t) = \sum_{i=1}^{N} \sqrt{P_i}\, h_i(t) e^{j2\pi f_i t} \Big/ \sum_{i=1}^{N} \sqrt{P_i}, \quad (-T_W \leq t \leq T_W) \quad \text{Eq. 7}$$

where w(t) is a unitary clipping window function in the time (t) domain, $P_i$ is an average power of one of the plurality of unshaped baseband transmission signals, $h_i$ is a unitary impulse response of one of the plurality of shaping filters, N is a total number of baseband transmission signals, and $T_W$ is a time period of a response, where $$T_W = \max_i \{T_i^{Shp}\}.$$

Figure 3:
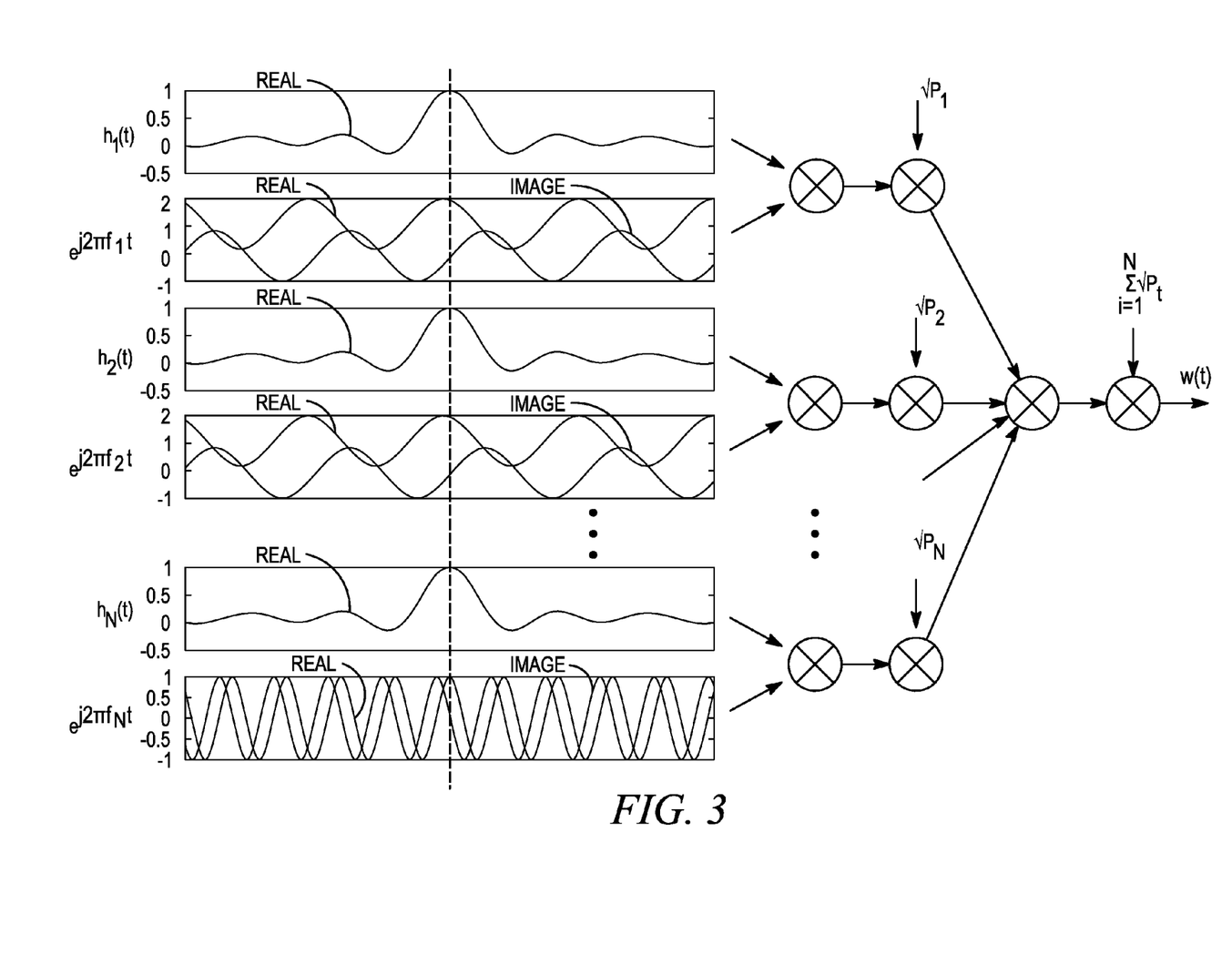
FIG. 3 is a diagram illustrating generation of a unitary clipping window function w(t), according to some embodiments of the present invention.

Referring to FIG. 3, a diagram illustrates a generation of w(t), according to some embodiments of the present invention. If the unitary clipping window function w(t) is directly used by the window output units 245-1 to 245-M, the multi-carrier transmitter 200 can achieve low out-of-band emission in a clipping signal. However, in some cases there may be a long clipping window, and hence a high processing delay time that requires a more complex transmitter. That is because a processing delay time and a required number of window output units 245-1 to 245-M increases linearly with the length of a clipping window. Thus it is useful to compromise between levels of out-of-band emission and the delay/complexity of the multi-carrier transmitter 200. Such compromise can be accomplished by further applying a modified window (denoted as $w_h(t)$ $(-T_m \leq t \leq T_m)$) on w(t). For example, the modified window can be a Hanning window or a modified Kaiser window. A modified Kaiser window can be obtained by subtracting a minimal value from a standard Kaiser window and making the peak values unitary. A final version of a clipping window signal $w_m(t)$ thus can be defined as follows:

$$w_m(t) = w(t) \bullet w_h(t) \; (-T_m \leq t \leq T_m) \cap (T_m < T_W) \quad \text{Eq. 8}$$

Figure 4:
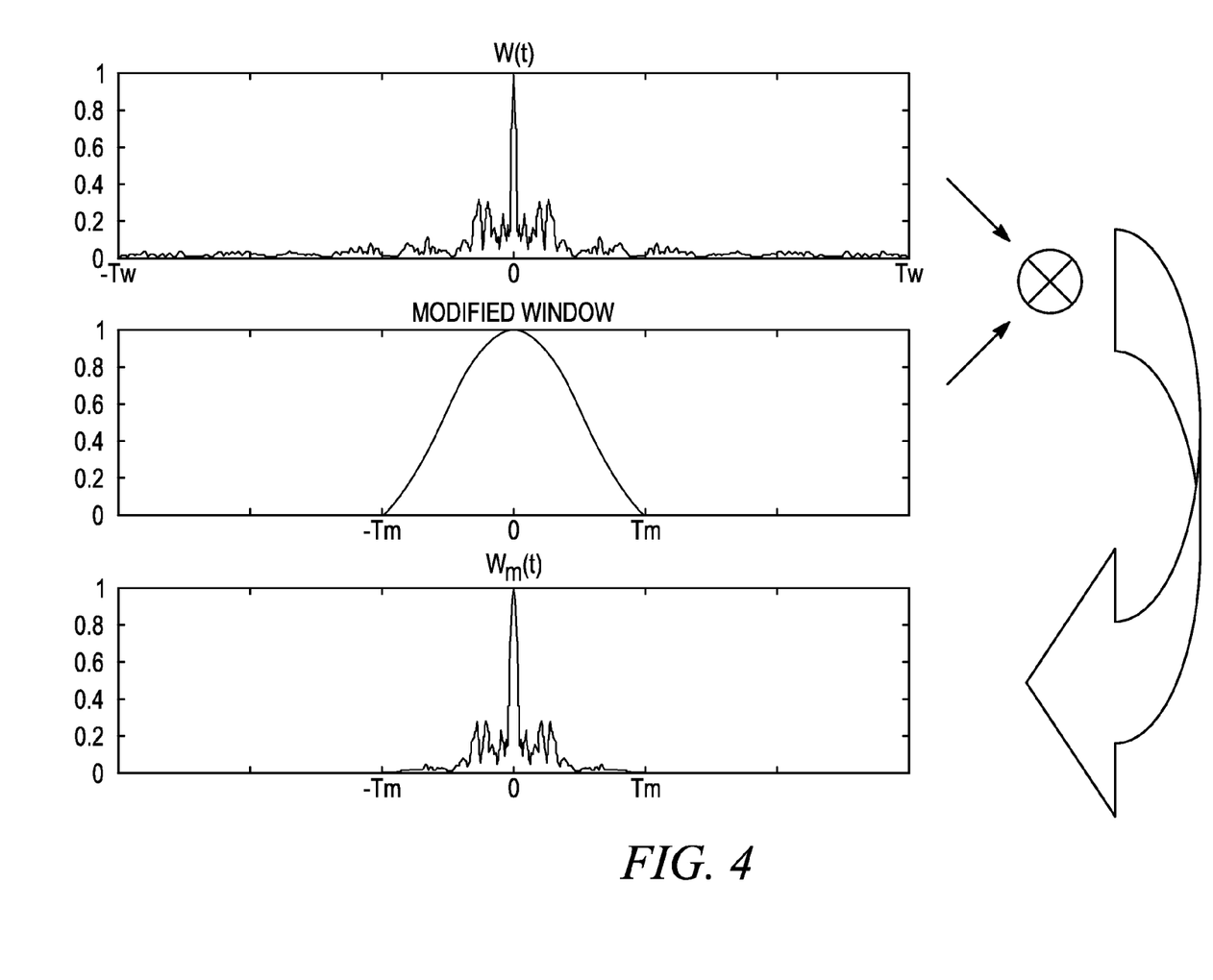
FIG. 4 is a diagram illustrating generation of a clipping window signal $w_m(t)$, according to some embodiments of the present invention.

Referring to FIG. 4, a diagram illustrates a generation of a clipping window signal $w_m(t)$, according to some embodiments of the present invention. Here, a trade-off between out-of-band emission and processing delay/complexity can be made by choosing a suitable parameter $T_m$. The selection of $T_m$ should be determined based on complexity, out-of-band emission requirements and allowed process delay. As described above, deploying w(t) directly can achieve low out-of-band emission, but also results in high complexity and process delay. As $T_W$ decreases, process delay and complexity also decreases, but out-of-band emission increases.

The clipping window signal $w_m(t)$ can be calculated by hardware or software. After the coefficients of $w_m(t)$ are generated, they can be stored in a random access memory (RAM) (not shown) of the multi-carrier transmitter 200. Each of the window output units 245-1 to 245-M can then access the RAM to retrieve the coefficients of $w_m(t)$.

The peak detector 230 monitors a signal $S_{fbk}(t)$ output from the summing unit 240, which signal is a non-delayed version of the transmitted signal with a clipping feedback. The peak detector 230 determines if there is a peak having a magnitude that exceeds a clipping threshold $T_{clp}$. The peak detector 230 also determines a weight coefficient of the clipping window, where the weight coefficient is equal to the following:

$$(|S_{fbk}(t_p)| - T_{clp}) \cdot \frac{S_{fbk}(t_p)}{|S_{fbk}(t_p)|},$$

where $t_p$ is a time when a peak is detected. Further, the peak detector 230 can allocate a "free" window output unit 245-n (i.e., one of the window output units 245-1 to 245-M that is not currently outputting) when a peak needs to be clipped. The peak detector 230 then sends the weight coefficient and a clipping indication to the free window output unit 245-n, so as to achieve a high utilization efficient.

Because the average power of each carrier generally changes slowly, and because the frequency offset of each carrier generally does not change significantly during operation, in some circumstances it is not necessary to perform a real-time calculation of w(t) or $w_m(t)$. Rather, non-real-time calculations can be accomplished by either hardware or software.

The construction of $w_m(t)$ can cause it to have a sharp peak in the time domain, which avoids unwanted clipping of those points far away from the peak, and greatly reduces the probability of causing extra peaks in the clipped signal.

If a high crest factor (CF) reduction is expected, more than one stage of clipping may be needed. In such circumstances, the FIFO delay module 265, the peak detector 230, and the window output units 245-1 to 245-M can be added or multiplexed to provide an additional clipping stage.

The window output units 245-1 to 245-M have two primary functions. First, the window output units 245-1 to 245-M generate subtraction-based clipping window signals based on requests received from the peak detector 230. Second, the window output units 245-1 to 245-M generate "early" clipping feedback signals $S_{fbk}(t)$, which are used to prevent over-clipping. Correspondingly, a feed-forward output port and a feedback output port are included in each window output unit 245-1 to 245-M.

To illustrate the function of the window output units 245-1 to 245-M, consider that the peak detector 230 detects a peak exceeding a clipping threshold at a time $t_p$. An indication therefore will be sent to a "free" window output unit 245-n, and a weight coefficient as calculated above also will be sent to the window output unit 245-n. The window output unit 245-n then begins outputting a clipping window after the window output unit 245-n receives a clipping indication. The clipping window can be represented by the following product:

$$(|S_{fbk}(t_p)| - T_{clp}) \cdot \frac{S_{fbk}(t_p)}{|S_{fbk}(t_p)|} \cdot w_m(t - t_p - T_m).$$

From the above product it is clear that the window output unit 245-n outputs the unitary clipping window scaled with a weight coefficient received from the peak detector 230.

Figure 5:
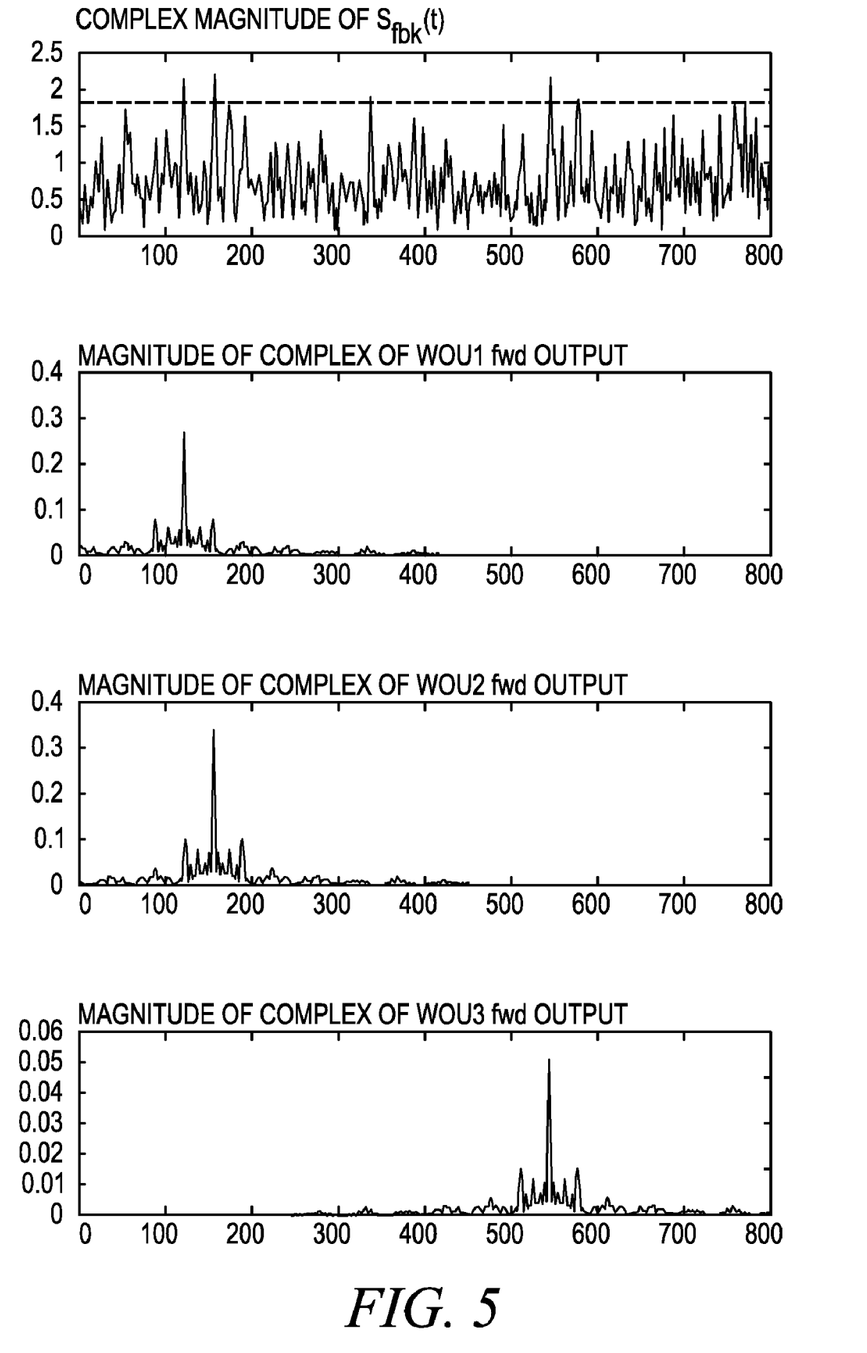
FIG. 5 includes several graphs of simulated signals that illustrate operation of feed-forward output ports of window output units, according to some embodiments of the present invention.

Referring to FIG. 5, several graphs of simulated signals illustrate operation of the feed-forward output ports of the plurality of window output units 245-1 to 245-M, according to some embodiments of the present invention. The simulated signals are based on an equal power, eight-carrier CDMA 2000 system.

It is possible that two adjacent peaks exceeding a clipping threshold can be both clipped by the clipping window applied to the first peak, so that both peaks are reduced below the clipping threshold. However, a forward output branch from a feed-forward output port is used to clip the delay version of $S_{fbk}(t)$, while the peak detector 230 monitors the non-delay version of the transmitted signal. That means that "over-clipping" might be caused if no "early" feedback is provided to the peak-detector 230. Therefore, the clipping feedback output is provided from the window output units 245-1 to 245-M.

When activated, the output of a feedback branch is defined by the following product:

$$(|S_{fbk}(t_p)| - T_{clp}) \cdot \frac{S_{fbk}(t_p)}{|S_{fbk}(t_p)|} \cdot w_m(t - t_p).$$

The output is an "earlier" version of the forward branch output signals.

Figure 6:
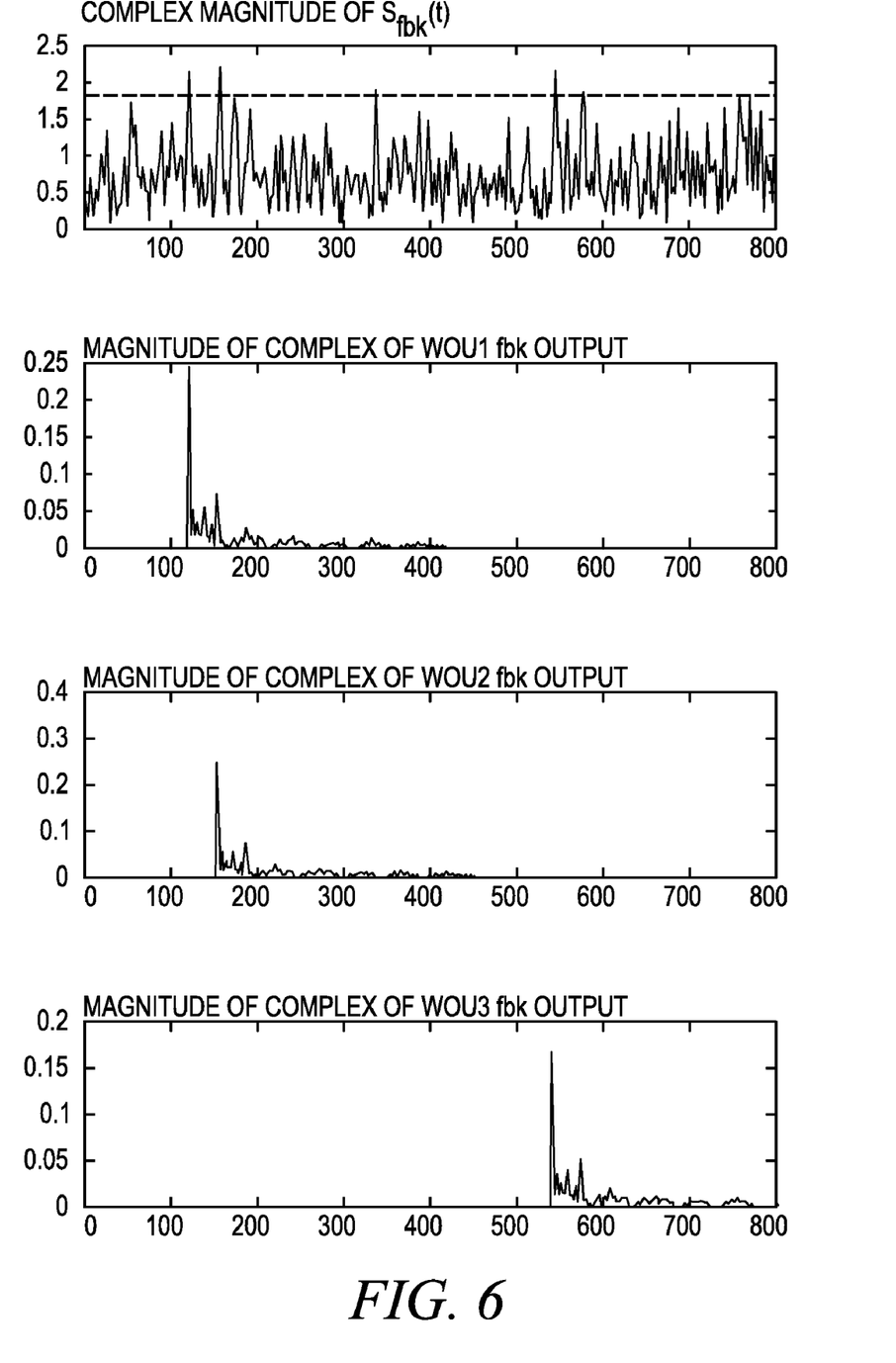
FIG. 6 includes several graphs of simulated signals that illustrate operation of feedback output ports of window output units, according to some embodiments of the present invention.

Referring to FIG. 6, several graphs of simulated signals illustrate operation of the feedback output ports of the window output units 245-1 to 245-M, according to some embodiments of the present invention. The simulated signals are based on an equal power, eight-carrier CDMA 2000 system.

After being activated, the window output units 245-1 to 245-M output an entire series of the clipping window, and then return again to a "free" mode. In the "free" mode, the output of the window output units 245-1 to 245-M is zero.

The FIFO delay module 265 delays the summed signal $S_{fbk}(t)$ by an appropriate time to compensate for the delays introduced by the peak detector 230 and by the clipping window. Each window output unit 245-1 to 245-M attempts to cancel only one peak each time it is activated. As described above, because more than one peak might be found to exceed the clipping threshold during a time span of $2T_m$, more than one clipping window could be simultaneously subtracted from $S_{fbk}(t)$, and thus more than one window output unit 245-1 to 245-M could be needed. The number (M) of needed window output units 245-1 to 245-M is determined based on a target CF reduction, clipping window length, and transmitted signal characters.

The window output units 245-1 to 245-M do not start outputting until the peak detector 230 detects a peak in the $S_{fbk}(t)$ signal. Theoretically, a center of the clipping window should be aligned with the detected peak in the $S_{fbk}(t)$ signal. However, after being activated, a time $T_m$ is required for outputs of the window output units 245-1 to 245-M to reach their maximum magnitude. That means there is a delay of $T_m$ between the forward output of the window output units 245-1 to 245-M and S(t). Therefore, to align with the clipping window, S(t) is delayed by $T_m$. The FIFO delay module 265 thus delays S(t) by $T_m$ to match the delay of the clipping signal.

Finally, the output of the summing unit 260 is the multicarrier communication signal having a reduced crest factor, which is a sum of the delayed transmission signal added to a sum of the plurality of subtraction-based clipping window signals.

Figure 7:
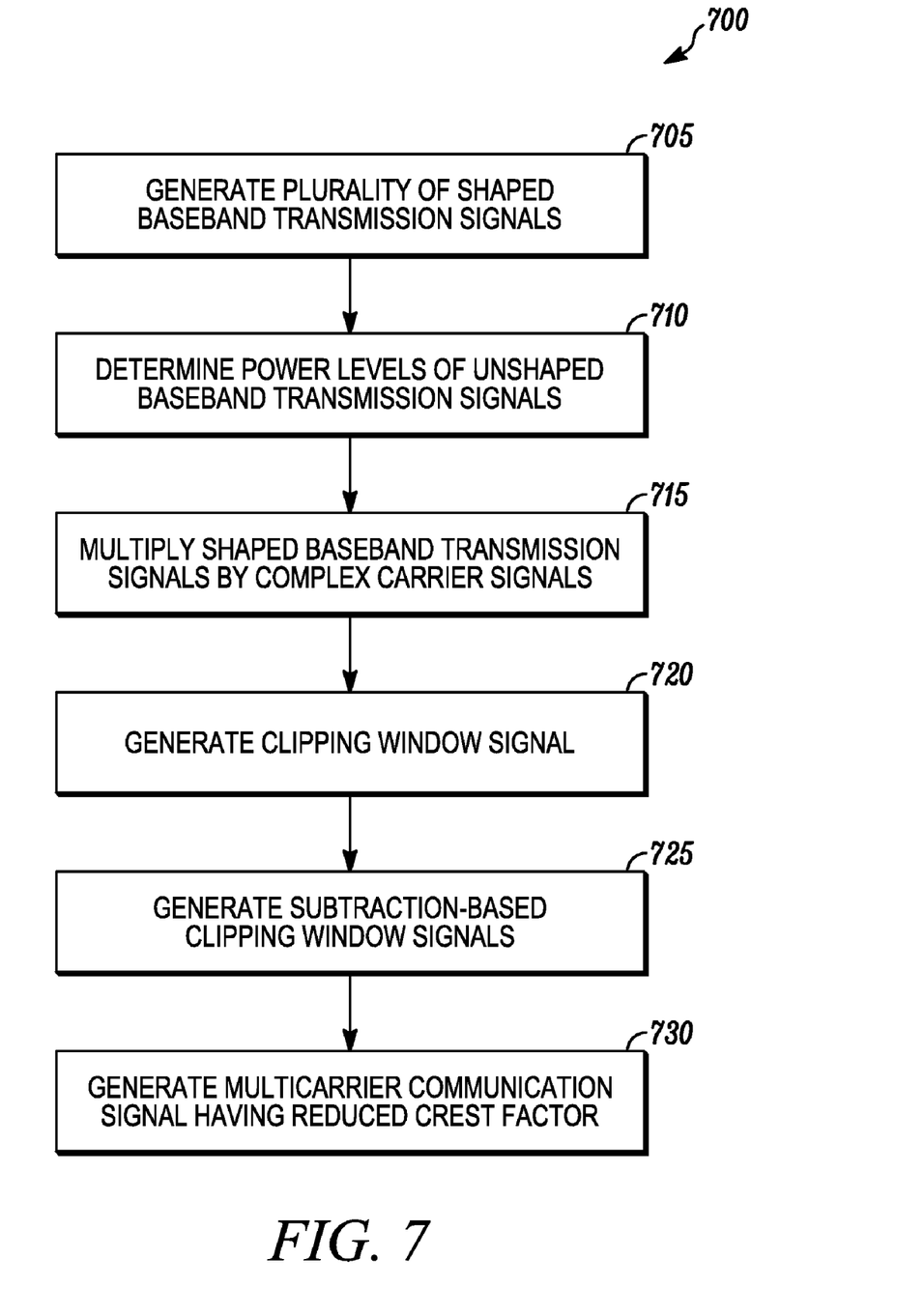
FIG. 7 is a general flow diagram illustrating a method for generating a multicarrier communication signal having a reduced crest factor, according to some embodiments of the present invention.

Referring to FIG. 7, a general flow diagram illustrates a method 700 for generating a multicarrier communication signal having a reduced crest factor, according to some embodiments of the present invention. At step 705, a plurality of shaped baseband transmission signals are generated from a plurality of unshaped baseband transmission signals. For example, the transmission shaping filters 105-1 to 105-N receive unshaped baseband transmission signals (BBTxSig1 to BBTxSigN) and output shaped baseband transmission signals (ShpBBTxSig1 to ShpBBTxSigN).

At step 710, power levels of the plurality of unshaped baseband transmission signals are determined. For example, the power detector 225 is deployed to measure the long-term average power of each carrier in the form of the unshaped baseband transmission signals (BBTxSig1 to BBTxSigN). Alternatively, as described above, the power detector 225 can be omitted if the power of each carrier is pre-determined.

At step 715, each signal of the plurality of shaped baseband transmission signals is multiplied by one of a plurality of complex carrier signals. For example, the mixers 210-1 to 210-N are used to multiply the shaped baseband transmission signals (ShpBBTxSig1 to ShpBBTxSigN) by complex carrier signals received from the numeric control oscillators (NCOs) 115-1 to 115-n.

At step 720, a clipping window signal is generated based on the power levels of the plurality of baseband transmission signals. For example, the clipping window signal $w_m(t)$ is generated based on the power levels of the plurality of the unshaped baseband transmission signals (BBTxSig1 to BBTxSigN) derived from the unitary clipping window function w(t).

At step 725, a plurality of subtraction-based clipping window signals is generated from the clipping window signal and peak power levels of the plurality of shaped baseband transmission signals. For example, the window output units 245-1 to 245-M generate subtraction-based clipping window signals based on requests received from the peak detector 230.

Finally, at step 730, the multicarrier communication signal having the reduced crest factor is generated from the plurality of subtraction-based clipping window signals and from the shaped baseband transmission signals. For example, a multicarrier communication signal having a reduced crest factor is output from the summing unit 260.

Advantages of the present invention thus include enabling a reduction in the crest factor (CF) of signals transmitted from high power amplifiers, which in turn enables more efficient amplifier design and operation. Resulting clipped signals have an effective spectrum because the unitary clipping window function w(t) has the same spectrum envelop as $S_{sum}(t)$, and the spectrum envelope of $w_m(t)$ is similar to the spectrum envelop of $S_{sum}(t)$, even though $w_m(t)$ has additional out-ofband emission. Because a power level of each carrier is considered, interference caused by clipping can be appropriately distributed to all carriers. Further, because the subtraction window has a sharp peak in the time domain, undesirable clipping of neighboring peaks is avoided As will be understood by those having ordinary skill in the art, the crest factor reduction (CFR) apparatus and method described herein are not limited to multi-carrier CDMA systems, but also can be applied to or performed in other multi-carrier systems that operate in communication networks that use at least one of the following technologies: wideband code division multiple access (WCDMA) technology, time division-synchronous code division multiple access (TD-SCDMA) technology, and worldwide interoperability for microwave access (Wimax) technology. Further, the teachings of the present invention are also applicable to hybrid systems that employ different carriers having different modulation bandwidths.

It will be appreciated that embodiments of the invention described herein may be comprised of one or more conventional processors and unique stored program instructions that control the one or more processors to implement, in conjunction with certain non-processor circuits, some, most, or all of the functions of generating a multicarrier communication signal having a reduced crest factor as described herein. The non-processor circuits may include, but are not limited to, a radio receiver, a radio transmitter, signal drivers, clock circuits, power source circuits, and user input devices. As such, these functions may be interpreted as steps of a method for generating a multicarrier communication signal having a reduced crest factor. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. An apparatus for generating a multicarrier communication signal having a reduced crest factor, comprising:
a plurality of shaping filters for receiving a plurality of unshaped baseband transmission signals and outputting a corresponding plurality of shaped baseband transmission signals;
a plurality of mixers, each operatively connected to one of the plurality of shaping filters, for multiplying each signal of the plurality of shaped baseband transmission signals by one of a plurality of complex carrier signals;
a window function generator for generating a clipping window signal based on power levels of the plurality of unshaped baseband transmission signals;
a peak detector, operatively connected to the plurality of mixers;
a plurality of window output units, each operatively connected to both the window function generator and the peak detector, for outputting a plurality of subtraction-based clipping window signals; and
at least one summing unit, operatively connected to the plurality of window output units and to the plurality of mixers, for generating, from the plurality of subtraction-based clipping window signals and the plurality of shaped baseband transmission signals, the multicarrier communication signal having the reduced crest factor.

2. The apparatus according to claim 1, wherein the window function generator generates the clipping window signal based on a unitary clipping window function that conforms to the following equation:

$$w(t) = \sum_{i=1}^{N} \sqrt{P_i}\, h_i(t) e^{j2\pi f_i t} \Big/ \sum_{i=1}^{N} \sqrt{P_i}\, , (-T_W \leq t \leq T_W)$$

where $w(t)$ is a unitary clipping window function in the time (t) domain, $P_i$ is an average power of one of the plurality of unshaped baseband transmission signals, $h_i$ is a unitary impulse response of one of the plurality of shaping filters, $f_i$ is a frequency of one of the plurality of complex carrier signals, i is a positive integer, N is a total number of baseband transmission signals, and $T_W$ is a time period of a response.

3. The apparatus according to claim 1, wherein the window output units also generate clipping feedback signals.

4. The apparatus according to claim 1, further comprising a power detector operatively connected to the plurality of shaping filters and to the window function generator, for detecting the power levels of the plurality of unshaped baseband transmission signals.

5. The apparatus according to claim 1, further comprising a first in first out delay module, operatively connected to the plurality of mixers, for delaying a summed signal generated by adding each of the plurality of shaped baseband transmission signals multiplied by one of the plurality of complex carrier signals.

6. The apparatus according to claim 5, wherein the multicarrier communication signal having a reduced crest factor is a sum of an output signal of the first in first out delay module added to a sum of output signals from the plurality of window output units.

7. The apparatus according to claim 1, wherein the apparatus operates in a communication network that uses at least one of the following technologies: code division multiple access technology, wideband code division multiple access technology, time division-synchronous code division multiple access technology, and worldwide interoperability for microwave access technology.

8. An apparatus for generating a multicarrier communication signal having a reduced crest factor, comprising:
means for generating a plurality of shaped baseband transmission signals from a plurality of unshaped baseband transmission signals;

means for determining power levels of the plurality of unshaped baseband transmission signals;

means for multiplying each signal of the plurality of shaped baseband transmission signals with one of a plurality of complex carrier signals;

means for generating a clipping window signal based on the power levels of the plurality of unshaped baseband transmission signals;

means for generating a plurality of subtraction-based clipping window signals from the clipping window signal and peak power levels of the plurality of shaped baseband transmission signals; and means for generating, from the plurality of subtraction-based clipping window signals and from the shaped baseband transmission signals, the multicarrier communication signal having a reduced crest factor.

9. The apparatus according to claim 8, wherein the clipping window signal is based on the following equation:

$$w(t) = \sum_{i=1}^{N} \sqrt{P_i}\, h_i(t) e^{j2\pi f_i t} \Big/ \sum_{i=1}^{N} \sqrt{P_i}\,, \; (-T_W \le t \le T_W)$$

where w(t) is a unitary clipping window function in the time (t) domain, $P_i$ is an average power of one of the plurality of unshaped baseband transmission signals, $h_i$ is a unitary impulse response of one of a plurality of shaping filters, $f_i$ is a frequency of one of the plurality of complex carrier signals, i is a positive integer, N is a total number of baseband transmission signals, and $T_W$ is a time period of a response.

10. The apparatus according to claim 8, wherein the means for generating a plurality of subtraction-based clipping window signals also generates clipping feedback signals.

11. The apparatus according to claim 8, further comprising means for detecting the power levels of the plurality of shaped baseband transmission signals before generating the clipping window signal.

12. The apparatus according to claim 8, further comprising means for generating a delayed transmission signal by delaying a summed signal generated by adding each of the plurality of shaped baseband transmission signals multiplied by one of the plurality of complex carrier signals.

13. The apparatus according to claim 8, wherein the multicarrier communication signal having a reduced crest factor is a sum of the delayed transmission signal added to a sum of the plurality of subtraction-based clipping window signals.

* * * * *